United States Patent Office 3,337,503
Patented Aug. 22, 1967

3,337,503
POLYOXYMETHYLENE POLYMER AND POLYMERIZATION PROCESS
Arthur W. Schnizer and Walter E. Heinz, Corpus Christi, Tex., assignors to Celanese Corporation, a corporation of Delaware
No Drawing. Filed Feb. 15, 1961, Ser. No. 89,371
9 Claims. (Cl. 260—67)

This invention relates to oxymethylene polymers and particularly to a method of preparing oxymethylene polymers of controlled molecular weight.

Oxymethylene polymers having successive —$CH_2O$— groups may be prepared from trioxane as thermoplastic materials of exceptional toughness and stability.

It is desirable in the polymerization of trioxane to obtain products of optimum strength properties and also desirable to obtain products which are readily processable, particularly by extrusion and injection molding techniques. Prior to this invention, it has not been possible to polymerize trioxane to consistently and reproducibly produce products of excellent physical properties and processability.

It is an object of this invention to provide a method for reproducibly polymerizing trioxane to a polymer of desired processability and properties. Other objects will appear hereinafter.

The objects of this invention are achieved by a method of preparing oxymethylene polymers in which trioxane is maintained in contact with a cationic catalyst capable of polymerizing molten trioxane when maintained therein at a concentration of 5 p.p.m. to the extent of at least 65% in 10 minutes at a temperature permitted to rise from 60° C. to 100° C., and particularly in contact with a boron fluoride-containing catalyst until at least 65% of said trioxane is converted to a high molecular weight polymeric product the improvement which comprises adding to said trioxane from about 0.1 to about 3.0 moles per 1,000 moles of trioxane of a chain transfer agent the group consisting of acetals, alcohols, carboxylic acids and carboxylic acid anhydrides.

The use of chain transfer agents to control the molecular weight of polymers which are built up by a free radical mechanism is known. However, the polymerization of trioxane proceeds in the presence of a cationic boron fluoride-containing catalyst and involves an entirely different and not perfectly understood mechanism.

It is known that high molecular weight oxymethylene polymers may be prepared from trioxane in the presence of boron trifluoride-containing trioxane polymerization catalysts such as boron trifluoride, itself, boron trifluoride coordinate complexes with organic compounds in which oxygen or sulfur is the donor atom, boron trifluoride coordinate complexes with water and boron trifluoride coordinate complexes with basic trivalent nitrogen or phosphorus compounds which have ionization constants in water at 25° C. not higher than $1 \times 10^{-9}$. Complete disclosures of the foregoing catalysts and of polymerization in their presence may be found in application Ser. Nos. 691,144 and 691,143, filed by Donald E. Hudgin and Frank H. Berardinelli on Oct. 21, 1957 now U.S. Patents 2,989,507 and 2,989,506 respectively; application Ser. No. 718,124, filed by Hudgin and Berardinelli on February 28, 1958 now abandoned and application Ser. No. 782,411, filed by Arthur W. Schnizer on Dec. 23, 1958 now U.S. Patent 2,989,511.

The weight proportion of catalyst (based on boron fluoride content) to trioxane is usually between about 0.0002% and about 1.00% with from about 0.003% to about 0.010% being a preferred range for a continuous process and from about 0.0002% to about 0.007% being preferred in a batch system.

The polymerization is usually carried out at temperatures between about 45° and about 115° C. and preferably from about 60° to about 115° C. The reaction time for polymerization is usually between about 0.25 and about 120 minutes or until at least 65% of the trioxane is converted to a high molecular weight polymeric form. Reaction periods of 0.25 to 3 minutes are preferred for continuous reaction and periods from 10 to 120 minutes for batch reaction.

It is often desirable to carry out the polymerization reaction in the presence of a trioxane solvent such as cyclohexane. A complete description of trioxane polymerization in the presence of a trioxane solvent is included in application Ser. No. 691,145, filed by Hudgin and Berardinelli on Oct. 21, 1957 now U.S. Patent 2,989,508 and incorporated herein by reference.

In accordance with a preferred aspect of this invention trioxane is copolymerized with a cyclic ether having adjacent carbon atoms to produce copolymers having oxymethylene groups and oxyalkylene groups with adjacent carbon atoms. The preferred copolymerization is carried out in the presence of not more than about 20 wt. percent of solvent and most preferably in the presence of between about 0.5 and about 2 wt. percent of solvent in the continuous reaction.

Copolymers containing oxymethylene units and higher oxyalkylene units are described in application Ser. No. 63,491, filed Oct. 19, 1961 by Walling, Brown and Bartz now U.S. Patent 3,027,352 and incorporated herein by reference. The preferred copolymers are those made up of oxymethylene and oxyethylene groups, such as copolymers of trioxane and dioxolane or with ethylene oxide.

The copolymers prepared in accordance with U.S. Patent 3,027,352 are random copolymers in the sense that the higher oxyalkylene units are distributed among the oxymethylene units and are not concentrated in large blocks or segments. While the distribution of the higher oxyalkylene units is dependent upon the proportion thereof and the manner of contact and mixing, in general, at least 80% of the higher oxyalkylene units are preesnt in the polymer in segments of from one to three oxyalkylene units.

A preferred class of copolymers are those having oxymethylene and oxyethylene units, the oxyethylene units comprising between 10 and 1 percent of the total number of oxymethylene and oxyethylene units. The terminal oxyalkylene units generally have hydroxyl groups to complete their valence requirements. These copolymers are prepared by copolymerizing trioxane with a cyclic ether having the structure

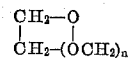

where $n$ is an integer from zero to two.

Among the specific cyclic ethers which may be used are ethylene oxide, 1,3-dioxolane, 1,3,5-trioxepane, 1,3-dioxane, trimethylene oxide, pentamethylene oxide, 1,2-propylene oxide, 1,2-butylene oxide, neopentyl formal, pentaerythritol diformal, and butadiene monoxide.

The chain transfer agents include acetals, alcohols, carboxylic acids and carboxylic acid anhydrides. The acetals include hemiacetals and polyacetals and preferably contain no more than about 18 successive carbon atoms. Polyoxymethylene dialkyl ethers of the formula

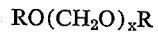

where $x$ is an integer from 1 to 10 and R is an alkyl group having up to 18 carbon atoms are suitable. For example, dioxymethylene dimethyl ether and trioxymethylene dimethyl ether may be used.

Polyoxymethylene diesters of the formula $$R\overset{O}{\underset{\|}{C}}-O(CH_2)_xC\overset{O}{\underset{\|}{R}}$$

where $x$ is an integer from 1 to 20 and R is selected from the group consisting of hydrogen and alkyl groups having up to 18 carbon atoms may also be used.

Aside from the polyacetals, it is preferred that the acetal be the reaction product of a primary or secondary alcohol having up to 18 carbon atoms with an aldehyde having up to seven carbon atoms. Formals and acetals (including hemi-formals and hemi-acetals) of unsaturated aliphatic alcohols, such as allyl alcohol; of cycloaliphatic alcohols, such as cyclohexanol; and of aromatic alcohols, such as benzyl alcohol may also be used. The formals of aromatic alcohols are subject to secondary reactions, such as boron trifluoride catalyzed condensation with formaldehyde (hydroxymethylation) but the reaction products are also effective chain transfer agents.

The alcohols are preferably those having from one to 18 carbon atoms, and particularly primary and secondary alcohols. Unsaturated alcohols, such as alkyl alcohol; monoalkyl ethers of glycols, such as Cellosolve $$(HOCH_2CH_2OCH_3)$$

chlorinated alcohols, such as chlorohydrin; and glycols such as ethylene glycol are included. Where glycols are used, some of the glycol may be incorporated into the polymer chain while the remainder acts as a chain transfer agent.

The carboxylic acids are preferably the aliphatic acids having up to eighteen carbon atoms. Anhydrides of these acids such as acetic, propionic, n-butyric, n-valeric, stearic and succinic anhydrides, may also be used. Aromatic acids and anhydrides, such as benzoic acid and phthalic anhydride may also be used despite the fact that they may give rise to secondary reactions, since the products of such reactions would also be chain transfer agents.

In order to polymerize in the desired molecular weight range, the chain transfer agents are usually added to the polymerization mixture in proportions between about 0.1 and about 3.0 moles of chain transfer agent per 1,000 moles of trioxane, and preferably between about 0.3 and about 0.7 mole of chain transfer agent per 1,000 moles of trioxane.

The preferred chain transfer agent is methylal because of its effectiveness as a chain transfer agent, its lack of effect on the activity of the polymerization catalyst and its compatibility with the catalyst and with the solvent.

It is preferred that the trioxane feed be as free as possible of impurities and other substances which might influence chain length. Usually the total amount of impurities in the trioxane will be less than about 50 mol percent of the amount of chain transfer agent added, and preferably less than about 20 mol percent.

*Example*

Trioxane and ethylene oxide were copolymerized continuously in an elongated reaction vessel having a screw with interrupted threads rotating and axially reciprocating in a cylindrical barrel having rows of teeth on its inner surface. The rotation and axial reciprocation of the screw was such as to cause the teeth of the barrel to pass through the interruptions in the thread of the screw. The apparatus is described in U.S. Patent 2,505,125.

The polymerization took place in the presence of boron fluoride dibutyl etherate, as catalyst and cyclohexane, as solvent. One run was made without any chain transfer agent and in other runs the nature and amount of chain transfer agent were varied. The general polymerization conditions were as follows:

| | |
|---|---|
| Monomer feed rate, lb. per hr. | About 50 |
| Ethylene oxide in monomer, wt. percent | 2.0 |
| Catalyst concentration (p.p.m. of BF$_3$ on trioxane) | About 75 |
| Trioxane/cyclohexane wt. ratio | About 60 |
| Screw speed, r.p.m. | 37 |
| Peak temperature °F | About 190 |

The products of the several runs were compared with respect to melt index. Melt index, a measure of molecular weight and processability is determined by heating a sample of the resin in a standard cylinder to a standard temperature of 190° C. and forcing it under a standard load of 2.16 kg. through a standard orifice of 0.0825 in. diameter for a standard period of 10 minutes and weighing the resin (in grams) passing through the orifice in this period. The test is described in detail in ASTM–D1238–57T.

The results were as follows:

| Example | Chain Terminating Agent | Concentration, moles/1,000 moles of trioxane | Melt Index |
|---|---|---|---|
| I | None | | 2.5 |
| II | Methylal | 0.27 | 9.5 |
| III | do | 0.81 | 21.0 |
| IV | Acetal | 0.27 | 4.6 |
| V | do | 0.54 | 19.5 |
| VI | Formic Acid | 0.27 | 5.4 |
| VII | Acetic Anhydride | 0.27 | 7.4 |
| VIII | Methanol | 0.27 | 5.4 |
| IX | do | 0.81 | 16.5 |

It is to be understood that the foregoing detailed description is given merely by way of illustration and that many variations may be made therein without departing from the spirit of our invention.

Having described our invention what we desire to secure by Letters Patent is:

1. In the method of preparing oxymethylene copolymers having recurring oxymethylene units and recurring oxyalkylene units having at least two carbon atoms, wherein trioxane and a cyclic ether having at least two adjacent carbon atoms are copolymerized by contacting said trioxane and said cyclic ether with a cationic catalyst, the improvement which comprises adding to said trioxane from about 0.1 to about 3.0 moles per 1000 moles of trioxane, of a chain transfer agent selected from the group consisting of acetals, alcohols, carboxylic acids and carboxylic acid anhydrides, said alcohols and carboxylic acids having up to eighteen carbon atoms, said anhydrides being those of carboxylic acids having up to eighteen carbon atoms, and said acetals being selected from the group consisting of (1) polyoxymethylene dialkyl ethers of the formula $RO(CH_2O)_xR$ where $x$ is an integer from 1 to 10 and R is an alkyl group having up to 18 carbon atoms, (2) polyoxymethylene diesters of the formula $$R\overset{O}{\underset{\|}{C}}-O(CH_2O)_xC\overset{O}{\underset{\|}{R}}$$

where $x$ is an integer from 1 to 20 and R is selected from the group consisting of hydrogen and alkyl groups having up to 18 carbon atoms, and (3) acetals, other than those specified in (1) and (2) above, of alcohols having up to 18 carbon atoms with aldehydes having up to 7 carbon atoms, said trioxane containing less than about 50 mol percent of impurities, based on the amount of chain transfer agent added.

2. The improvement of claim 1, wherein said trioxane contains less than about 20 mol percent of impurities.

3. In the method of preparing oxymethylene copolymers having recurring oxymethylene units and recurring oxyalkylene units having at least two carbon atoms, wherein trioxane and a cyclic ether having at least two adjacent carbon atoms are copolymerized by contacting said trioxane and said cyclic ether with a boron fluoride-containing catalyst, the improvement which comprises adding to said trioxane from about 0.1 to about 3.0 moles per 1000 moles of trioxane, of a chain transfer agent selected from the group consisting of acetals, alcohols, carboxylic acids, and carboxylic acid anhydrides, said alcohols and carboxylic acids having up to eighteen carbon atoms, said anhydrides being those of carboxylic acids having up to eighteen carbon atoms, and said acetals being selected from the group consisting of (1) polyoxymethylene dialkyl ethers of the formula

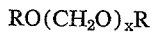

where $x$ is an integer from 1 to 10 and R is an alkyl group having up to 18 carbon atoms, (2) polyoxymethylene diesters of the formula

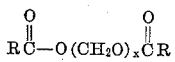

where $x$ is an integer from 1 to 20 and R is selected from the group consisting of hydrogen and alkyl groups having up to 18 carbon atoms, and (3) acetals, other than those specified in (1) and (2) above, of alcohols having up to 18 carbon atoms with aldehydes having up to 7 carbon atoms, said trioxane containing less than about 50 mol percent of impurities, based on the amount of chain transfer agent added.

4. The improvement of claim 3, wherein said chain transfer agent is methylal.

5. The improvement of claim 4, wherein said trioxane contains less than about 20 mol percent of impurities.

6. In the method of preparing oxymethylene copolymers having recurring oxymethylene units and recurring oxyethylene units, wherein trioxane and ethylene oxide are copolymerized by contacting said trioxane and said ethylene oxide with from about 0.0002 up to about 1.00 weight percent, based upon the trioxane, of a boron fluoride-containing catalyst, at a temperature between about 45 and about 115° C. for a period between about 0.25 and about 120 minutes, the improvement which comprises adding to said trioxane from about 0.1 to about 3.0 moles of methylal per 1000 moles of trioxane, said trioxane containing less than about 50 mol percent of impurities, based on the amount of chain transfer agent added.

7. In the method of preparing oxymethylene copolymers having recurring oxymethylene units and recurring oxyethylene units, wherein trioxane and 1,3-dioxolane are copolymerized by contacting said trioxane and said 1,3-dioxolane with from about 0.0002 up to about 1.00 weight percent, based upon the trioxane, of a boron fluoride-containing catalyst, at a temperature between about 45 and 115° C. for a period between about 0.25 and about 120 minutes, the improvement which comprises adding to said trioxane from about 0.1 to about 3.0 moles of methylal per 1000 moles of trioxane, said trioxane containing less than about 50 mol percent of impurities, based on the amount of chain transfer agent added.

8. In the method of preparing oxymethylene copolymers having recurring oxymethylene units and recurring oxyethylene units, wherein trioxane and from 0.1 to 20 weight percent of ethylene oxide, based upon the weight of trioxane, are copolymerized by contacting said trioxane and said ethylene oxide with from about 0.0002 up to about 1.00 weight percent based upon the trioxane, of a boron fluoride-containing catalyst, at a temperature between about 45 and about 115° C. for a period between about 0.25 and about 120 minutes, the improvement which comprises adding to said trioxane from about 0.1 to about 3.0 moles of methylal per 1000 moles of trioxane, said trioxane containing less than about 50 mol percent of impurities, based on the amount of chain transfer agent added.

9. The improvement of claim 8, wherein said trioxane contains less than about 20 mol percent of impurities.

References Cited

UNITED STATES PATENTS

| | | | |
|---|---|---|---|
| 2,304,431 | 12/1942 | Walker | 260—67 |
| 2,449,469 | 9/1948 | Gresham et al. | 260—615 |
| 2,795,571 | 6/1957 | Schneider | 260—67 |
| 2,989,509 | 6/1961 | Hudgin et al. | 260—67 |

FOREIGN PATENTS

| | | |
|---|---|---|
| 796,863 | 6/1958 | Great Britain. |
| 1,216,327 | 11/1959 | France. |

OTHER REFERENCES

Kern et al.: Papers and Summaries of International Symposium on Macromolecular Chemistry, June 14–18, 1960, Moscow, Section II, pages 280–285.

WILLIAM H. SHORT, *Primary Examiner.*

M. STERMAN, *Examiner.*

R. J. BUTTERMARK, L. M. PHYNES, L. P. QUAST,
*Assistant Examiners.*